Jan. 6, 1925.

W. E. DURHAM

HOG OILER

Filed Dec. 3, 1923  3 Sheets-Sheet 1

1,522,426

W. E. Durham INVENTOR

BY Victor J. Evans
ATTORNEY

R. A. Thomas

WITNESSES

Jan. 6. 1925.
W. E. DURHAM
HOG OILER
Filed Dec. 3, 1923
1,522,426
3 Sheets-Sheet 2
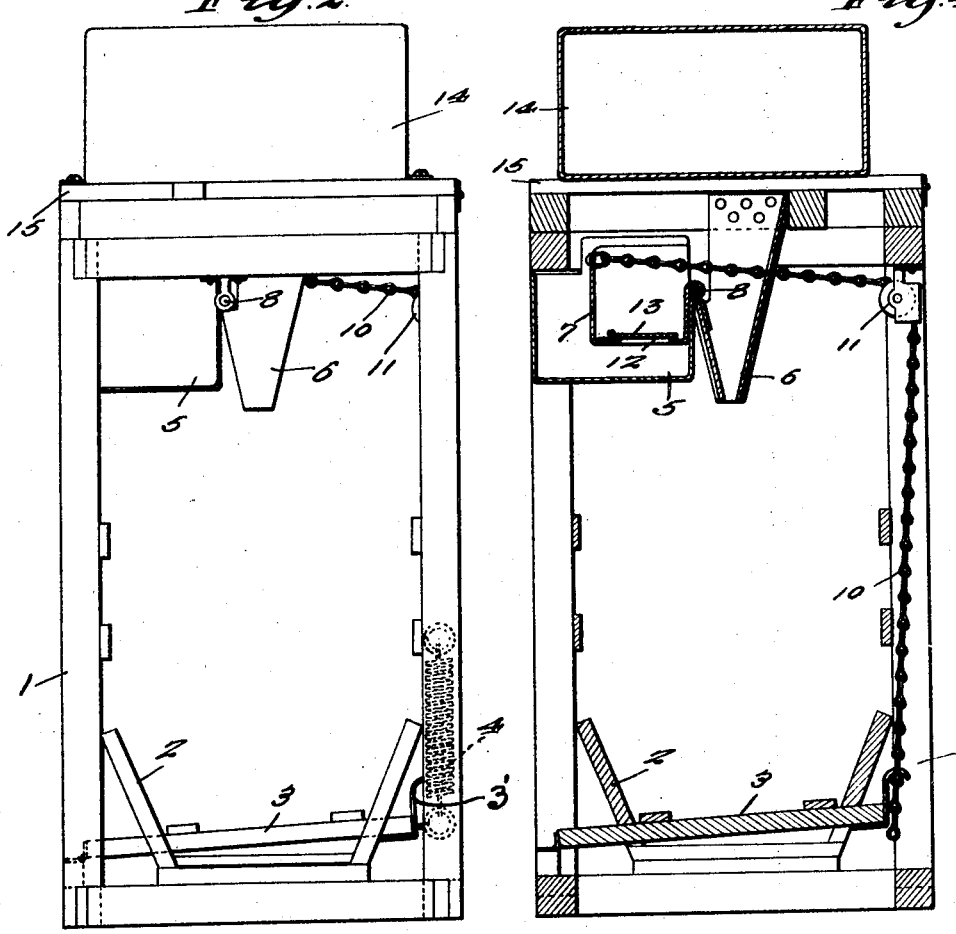
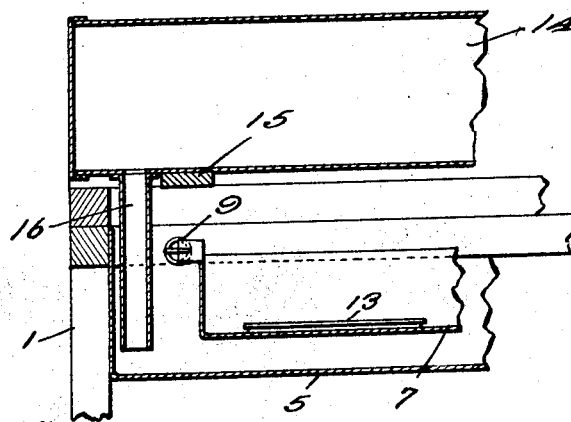

Jan. 6, 1925.
W. E. DURHAM
HOG OILER
Filed Dec. 3, 1923
1,522,426
3 Sheets-Sheet 3
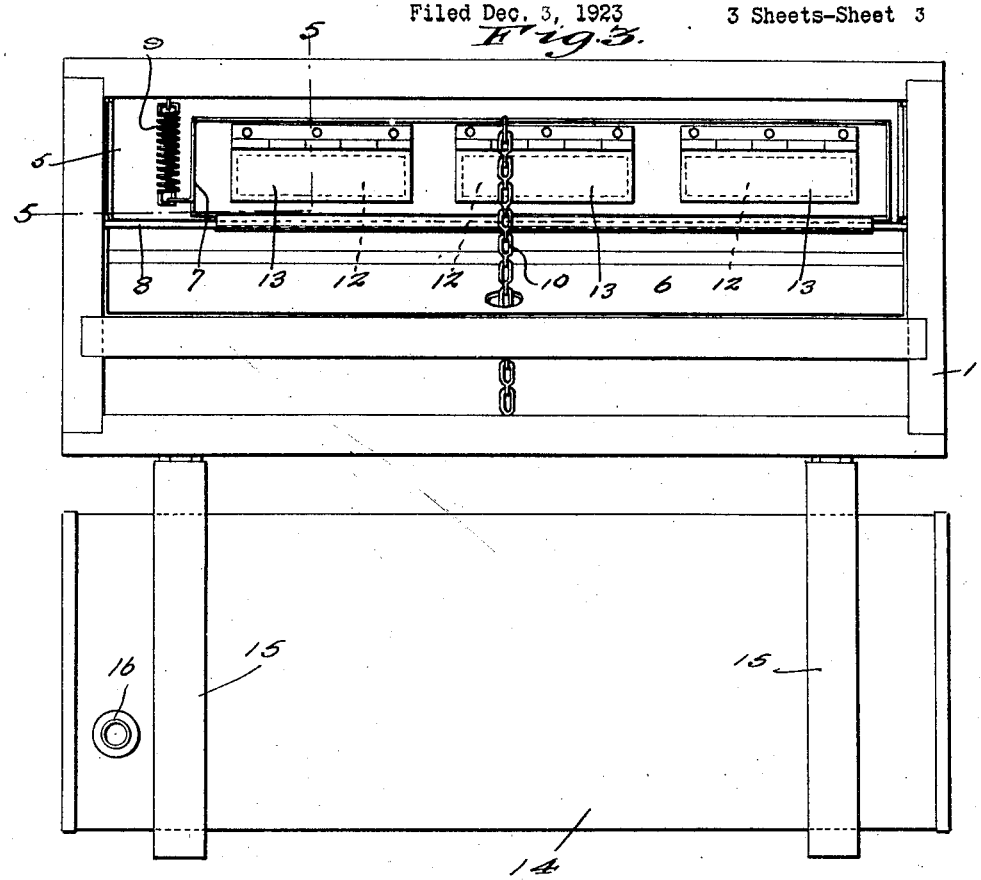
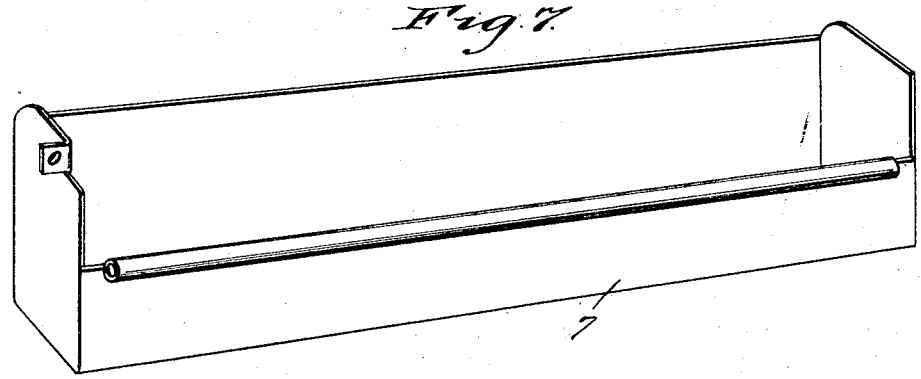
W. E. Durham INVENTOR
BY Victor J. Evans ATTORNEY
WITNESSES Patented Jan. 6, 1925.

1,522,426

UNITED STATES PATENT OFFICE.

WILLIAM E. DURHAM, OF REPUBLIC, KANSAS.

HOG OILER.

Application filed December 3, 1923. Serial No. 678,242.

*To all whom it may concern:*

Be it known that I, WILLIAM E. DURHAM, a citizen of the United States, residing at Republic, in the county of Republic and State of Kansas, have invented new and useful Improvements in Hog Oilers, of which the following is a specification.

This invention relates to a device for oiling hogs and other animals to rid the same of vermin, the general object of the invention being to provide a chute through which the animals are adapted to pass, with means operated by the weight of the animal for throwing oil upon the same as it passes through the chute.

Another object of the invention is to provide means for regulating the amount of oil thrown upon the animal.

A further object of the invention is to provide an oil tank, a trough to which the oil is automatically delivered from the tank, a dipper for taking some of the oil from the trough and discharging it into a distributor which distributes it upon the hog, with means for operating the dipper by the weight of the hog.

This invention also consists in certain other features of construction and in the combination and arrangement of the several parts, to be hereinafter fully described, illustrated in the accompanying drawings and specifically pointed out in the appended claims.

In describing my invention in detail, reference will be had to the accompanying drawings wherein like characters denote like or corresponding parts throughout the several views, and in which:—

Figure 2 is an end view.

Figure 3 is a plan view with the tank swung outwardly.

Figure 4 is a section on line 4—4 of Figure 1.

Figure 5 is a section on line 5—5 of Figure 3.

Figure 7 is a view of the dipper.

Figure 1:
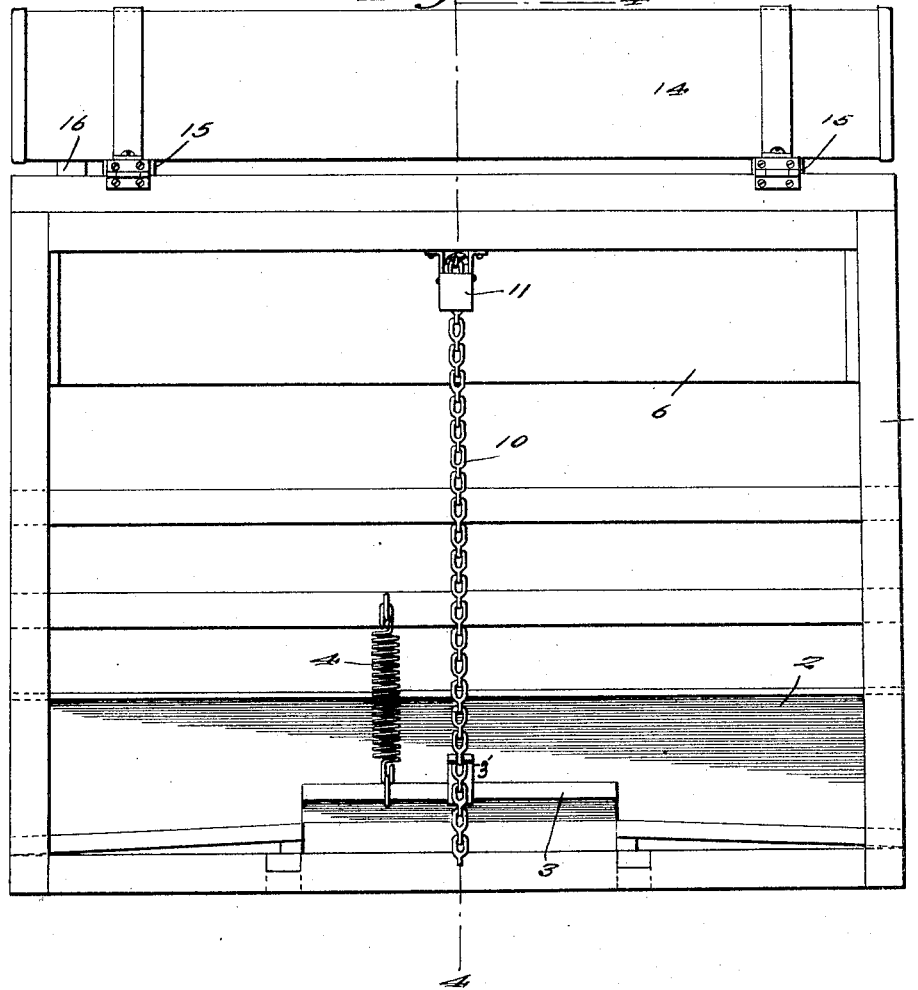
Figure 1 is a side view of the device.
Figure 6:
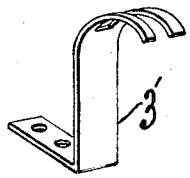
Figure 6 is a detail view of the hook-shaped bracket for connecting the chain to the platform.

In these views, 1 indicates a frame which has its ends open and which has trough-like part 2 at its bottom which forms a passageway for the animals to be treated. A trap door 3 is placed in this trough and this trap door is normally held in raised position by the spring 4 which has one end connected with the door and its other end with an upper part of the frame. A trough 5 is located in the upper part of the frame and a tapering distributor 6 is arranged alongside the trough. A dipper 7 is hingedly supported at the junction of the distributor with the trough by the shaft 8 so that when the dipper is swung outwardly it will empty its contents into the distributor and this distributor will direct the oil onto the animal passing through the device. The dipper is normally held in the trough by means of the spring 9 and it is moved into emptying position when the trap door is depressed by means of the chain 10 which connects the said door with the dipper and which passes over suitable guiding pulleys 11. The platform carries a hook-shaped bracket 3' with which the chain engages so that the chain is adjustably connected with the platform. The bottom of the dipper is provided with holes 12 which are covered by the flap valves 13 which are so arranged that they will open and permit some of the liquid in the trough to enter the dipper on the downward movement of the dipper but will close to prevent the escape of this liquid on the upward movement of the dipper. A supply tank 14 is carried by the strips 15 which are hingedly connected with the top of the frame. A spout 16 is connected with the bottom of the tank and when the tank is in normal position this spout will extend into the trough so that oil will flow from the supply tank into the trough until the level in the trough reaches the lower end of the spout when further flow of oil will be prevented by reason of the fact that air cannot enter the tank. When the supply tank is swung over to place its bottom uppermost the spout will act as a filling opening.

From the foregoing it will be seen that when an animal passes through the device and comes upon the door 3, its weight will cause the dipper to swing over to empty its contents into the distributor which will direct the oil upon the animal. As the animal passes off the door the spring will raise the same and the other spring will return the dipper to normal position, the valves in the dipper opening to permit the oil in the trough to pass into the same so that the device will be ready to treat another animal passing through the same. The oil in the trough will be kept at a constant level by being connected with the supply tank. In this way hogs and other animals can be kept free of vermin as the oil dropping upon the animal will flow over its body and down its legs and thus come in contact with all parts thereof.

By adjusting the length of the chain the amount of oil thrown upon the animal can be regulated.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A device of the class described comprising a frame forming a passageway, a movable platform forming a portion of the bottom of the passageway, a trough carried by the frame, a dipper in the trough, means actuated by the downward movement of the platform for swinging the dipper out of the trough and a distributor for receiving the contents of the dipper and directing it upon the animal passing through the passageway.

2. A device of the class described comprising a frame forming a passageway, a movable platform forming a portion of the bottom of the passageway, a trough carried by the frame, a dipper in the trough, means actuated by the downward movement of the platform for swinging the dipper out of the trough, a distributor for receiving the contents of the dipper and directing it upon the animal passing through the passageway and automatic means for keeping a constant supply of oil in the trough.

3. A device of the class described comprising a frame forming a passageway, a movable platform forming a portion of the bottom of the passageway, a trough carried by the frame, a dipper in the trough, means actuated by the downward movement of the platform for swinging the dipper out of the trough, a distributor for receiving the contents of the dipper and directing it upon the animal passing through the passageway, automatic means for keeping a constant supply of oil in the trough, such means consisting of a tank hingedly connected with the frame and having a spout at its bottom which extends into the trough when the tank is in normal position and which acts as a filling means when the tank is in inverted position.

4. A device of the class described comprising a frame forming a passageway, a movable platform forming a portion of the bottom of the passageway, a trough at the upper part of the frame, a dipper hingedly supported and normally resting in the trough, a valve in the bottom of the dipper for permitting some of the contents of the trough to enter the same, a flexible member connecting the platform with the dipper and a distributor for receiving the contents of the dipper and directing it upon the animal passing through the passageway.

5. A device of the class described comprising a frame forming a passageway, a movable platform forming part of the bottom of the passageway, a spring for normally holding the platform in raised position, a trough at the upper part of the frame, a distributor alongside the trough for directing oil upon the animal passing through the frame, a dipper for taking oil from the trough and discharging it into the distributor, a flap valve in the bottom of the dipper, an adjustable flexible member for connecting the dipper with the platform, a tank hingedly connected with the top of the frame and a spout on the bottom of the same for extending into the trough to keep the same supplied with liquid.

In testimony whereof I affix my signature.

WILLIAM E. DURHAM.